(12) United States Patent
Chung et al.

(10) Patent No.: US 12,202,623 B2
(45) Date of Patent: Jan. 21, 2025

(54) APPARATUS FOR LOADING AND UNLOADING CARGO

(71) Applicants: Hyundai Motor Company, Seoul (KR); Kia Corporation, Seoul (KR)

(72) Inventors: Jae Hoon Chung, Seoul (KR); Jong Min Oh, Gyeonggi-do (KR); Ji A Lee, Seoul (KR); Ki Seok Sung, Gyeonggi-do (KR); Jong Kyu Choi, Gyeonggi-do (KR); Young Jun Byun, Seoul (KR); Kye Yoon Kim, Gyeonggi-do (KR); Ji Min Han, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 420 days.

(21) Appl. No.: 17/839,774

(22) Filed: Jun. 14, 2022

(65) Prior Publication Data
US 2023/0219687 A1   Jul. 13, 2023

(30) Foreign Application Priority Data
Jan. 10, 2022   (KR) .......................... 10-2022-0003239

(51) Int. Cl.
*B64D 9/00* (2006.01)
*B64C 1/20* (2006.01)
*B64D 45/00* (2006.01)

(52) U.S. Cl.
CPC .............. *B64D 9/003* (2013.01); *B64C 1/20* (2013.01); *B64D 45/0005* (2013.01); *B64D 2009/006* (2013.01)

(58) Field of Classification Search
CPC .............. B64D 9/003; B64D 45/0005; B64D 2009/006; B64D 9/00; B64C 1/20; B64C 17/02
See application file for complete search history.

(56) References Cited

U.S. PATENT DOCUMENTS

| | | | | |
|---|---|---|---|---|
| 1,837,781 A * | 12/1931 | Linder | ...................... | B62J 1/02 |
| | | | | 297/213 |
| 5,080,019 A * | 1/1992 | Takemura | .............. | B65G 37/02 |
| | | | | 198/465.4 |
| 5,692,862 A * | 12/1997 | Hilde | ..................... | B64D 9/003 |
| | | | | 410/80 |
| 6,435,796 B1 * | 8/2002 | Iversen | ................ | B65G 63/004 |
| | | | | 414/803 |
| 9,205,930 B2 | 12/2015 | Yanagawa | | |
| 10,181,152 B1 * | 1/2019 | Rao | ........................ | G06Q 10/08 |
| 11,066,168 B2 | 7/2021 | Clos et al. | | |

(Continued)

FOREIGN PATENT DOCUMENTS

KR   2019-0118842 A   10/2019

*Primary Examiner* — Kevin R Kruer
(74) *Attorney, Agent, or Firm* — Fox Rothschild LLP

(57) ABSTRACT

An apparatus for loading and unloading cargo, capable of loading cargo while distributing the weight of the cargo and unloading the cargo regardless of the loading order of the cargo, is provided. The apparatus for loading and unloading cargo may include: a base portion; a rail installed on the base portion; a plurality of movable plates disposed on the rail, supporting the cargo, and moving along the rail; and a raising-lowering portion connected between the base portion and a body so that the base portion can be raised and lowered.

18 Claims, 7 Drawing Sheets

(56) References Cited

U.S. PATENT DOCUMENTS

| | | | |
|---|---|---|---|
| 11,319,064 B1* | 5/2022 | Wittmaak, Jr. | B64D 9/003 |
| 11,597,291 B1* | 3/2023 | Bikumala | G06F 13/4282 |
| 11,753,146 B1* | 9/2023 | Pinto | B64C 17/02 |
| | | | 244/93 |
| 12,025,991 B2* | 7/2024 | Raabe | H04N 7/183 |
| 2010/0213313 A1 | 8/2010 | Reed et al. | |
| 2011/0215198 A1* | 9/2011 | Panzram | B64D 9/003 |
| | | | 244/118.1 |
| 2011/0315806 A1* | 12/2011 | Piasecki | B64U 50/11 |
| | | | 244/17.11 |
| 2012/0101636 A1* | 4/2012 | Huber | B64D 9/00 |
| | | | 700/275 |
| 2012/0312926 A1* | 12/2012 | Holzner | B64D 9/00 |
| | | | 244/137.1 |
| 2014/0255137 A1* | 9/2014 | Haertel | B64D 9/00 |
| | | | 414/529 |
| 2015/0108276 A1* | 4/2015 | Panzram | B64D 9/00 |
| | | | 244/137.1 |
| 2016/0119260 A1* | 4/2016 | Ghafourifar | H04L 51/216 |
| | | | 709/206 |
| 2016/0157653 A1* | 6/2016 | Manitta | A47G 29/20 |
| | | | 232/27 |
| 2019/0039751 A1* | 2/2019 | Janssen | A47G 29/124 |
| 2019/0092446 A1* | 3/2019 | Pirklbauer | B64D 9/00 |
| 2019/0263521 A1* | 8/2019 | O'Brien | B64D 1/12 |
| 2019/0270519 A1* | 9/2019 | Qiu | B64D 1/02 |
| 2020/0017218 A1* | 1/2020 | Ahmad | B64D 9/00 |
| 2020/0164966 A1* | 5/2020 | Suzuki | B64U 50/19 |
| 2020/0172241 A1* | 6/2020 | Green | B64U 10/13 |
| 2020/0180880 A1* | 6/2020 | Gil | A47G 29/141 |
| 2020/0354064 A1 | 11/2020 | Moore et al. | |
| 2021/0002107 A1* | 1/2021 | Zhang | F16D 1/076 |
| 2021/0011492 A1* | 1/2021 | Raabe | G05D 1/0676 |
| 2021/0321810 A1* | 10/2021 | Sun | G07F 11/1653 |
| 2021/0347575 A1* | 11/2021 | Lutz | B61B 13/00 |
| 2022/0067612 A1* | 3/2022 | Lee | G06Q 10/06315 |
| 2022/0219821 A1* | 7/2022 | Rivera | B64C 29/02 |
| 2022/0355929 A1* | 11/2022 | Gil | B64C 17/02 |
| 2022/0371729 A1* | 11/2022 | Saikin | G05D 1/12 |
| 2022/0380050 A1* | 12/2022 | Tian | B64D 1/12 |
| 2022/0411991 A1* | 12/2022 | Schechter | D06F 89/023 |
| 2023/0296893 A1* | 9/2023 | Maric | G02B 7/12 |
| | | | 359/630 |

* cited by examiner

APPARATUS FOR LOADING AND UNLOADING CARGO

CROSS-REFERENCE TO RELATED APPLICATION(S)

This application is based on and claims under 35 U.S.C. § 119(a) the benefit of Korean Patent Application No. 10-2022-0003239 filed on Jan. 10, 2022 in the Korean Intellectual Property Office, the disclosure of which is incorporated herein by reference in its entirety.

TECHNICAL FIELD

Embodiments of the present disclosure relates to an apparatus for loading and unloading cargo, capable of loading the cargo while distributing weight of the cargo, for example, in air mobility, and the like, and unloading the cargo regardless of a loading order of the cargo.

BACKGROUND

When cargo is loaded onto an aircraft, the center of gravity of the entire aircraft is moved by the center of gravity of the cargo, so aligning the centers of gravity is essential for efficient and safe flight.

For this purpose, in a normal aircraft, a load master measures and checks the weight of each piece of cargo and goes through a process of properly distributing the cargo in a cargo hold of the aircraft. Accordingly, a separate operation for distributing the cargo is required, and loading must be performed in order in consideration of weight and unloading must be performed in a reverse order of loading.

Unlike long-distance aircraft operating to only one location at a time, in the case of an air mobility courier service that needs to move quickly to several places over a relatively short distance, it is difficult to unload the cargo inside the cargo hold regardless of a loading order, if only the center of gravity of the cargo is considered. Accordingly, there is a problem in that it is impossible to load and unload the cargo within a short time, and thus efficient and safe flights cannot be guaranteed.

SUMMARY

An embodiment of the present disclosure is to provide an apparatus for loading and unloading cargo, capable of loading the cargo while distributing weight of the cargo, for example, in air mobility, and the like, and unloading the cargo regardless of a loading order of the cargo.

According to an embodiment of the present disclosure, an apparatus for loading and unloading cargo, may include a base portion; a rail installed on the base portion; a plurality of movable plates disposed on the rail, supporting the cargo, and moving along the rail; and a raising-lowering portion connected between the base portion and a body comprising a cargo hold so that the base portion can be raised and lowered.

The raising-lowering portion may have an operating rod expanding and contracting. The raising-lowering portion may be installed in the cargo hold of the body, and an end portion of the operating rod may be fixedly connected to the base portion.

The base portion may include a first base portion and a second base portion, wherein the first base portion and the second base portion may be fixedly disposed on the operating rod to be vertically spaced apart from each other, and a rail and a plurality of movable plates may be installed in the first base portion and the second base portion, respectively.

By an operation of the raising-lowering portion, the base portion may be raised or lowered in a space between the body and the ground.

The body may include an opening formed in a lower portion of a cargo hold, and the base portion may have a shape conforming to a shape of the opening or may have an area at least greater than an area of the opening to close the opening.

The apparatus for loading and unloading cargo may further include a barrier installed along an edge of the opening in the cargo hold.

The rail may be formed in a ring shape having a closed cross-section.

The base portion and the rail may have a circular or elliptical shape, and the movable plates may be formed in a sectoral shape.

A fastening portion may be formed on an upper surface of the movable plates for fixing cargo, and a standardized box in which the cargo is accommodated or a pallet to which the cargo is fixedly tied may be fixed on the movable plates by the fastening portion.

The apparatus for loading and unloading cargo may further include a traveling cart moving along the rail, at least one linear movement portion installed on the traveling cart, and a seating portion interposed between the linear movement portion and the movable plates.

The traveling cart may include a cart body, a plurality of rollers provided on the cart body for rolling along the rail, and a driving motor providing driving force to the rollers.

The linear movement portion may extend in a direction intersecting the rail on the cart body, and a moving block of the linear movement portion may be disposed to be movable radially on the base portion.

The seating portion may be fixedly installed on the moving block to support the movable plates to be movable in a straight line according to an operation of the linear movement portion.

The apparatus for loading and unloading cargo may further include a sensor unit, wherein the sensor unit may include a load sensing unit for sensing a weight of cargo placed on the movable plates, and a position sensing unit for sensing a position of the movable plates or the traveling cart moving on the rail.

The apparatus for loading and unloading cargo may further include a control unit for controlling a spacing and positions of a plurality of movable plates on the rail according to a sensing signal received from the sensor unit, wherein the control unit may be electrically connected to a driving motor of the traveling cart, a driving unit of the linear movement portion, and a driving source of the raising-lowering portion.

A movable plate without cargo among the plurality of movable plates may act as a weight used to adjust a center of gravity.

According to another embodiment of the present disclosure, an apparatus for loading and unloading cargo may include: a base portion; a rail installed on the base portion, a plurality of movable plates disposed on the rail, supporting the cargo, and moving along the rail; a raising-lowering portion connected between the base portion and a body so that the base portion can be raised and lowered; a sensor unit including a load sensing unit for sensing a weight of cargo placed on the movable plates; and a control unit configured to move at least one of the plurality of movable plates in a circumferential direction or radially on the rail according to a sensing signal received from the sensor unit.

The sensor unit may further include a position sensing unit for sensing a position of the movable plates moving on the rail, and the control unit may be configured to control a spacing and positions of the plurality of movable plates on the rail according to a sensing signal received from the sensor unit.

As discussed, the apparatus suitably includes use of a controller or processor.

In another aspect, air mobility vehicles are provided that comprise an apparatus as disclosed herein.

BRIEF DESCRIPTION OF DRAWINGS

The above and other embodiments, features, and advantages of embodiments of the present disclosure will be more clearly understood from the following detailed description, taken in conjunction with the accompanying lead-outs, in which.

DETAILED DESCRIPTION

Figure 1:
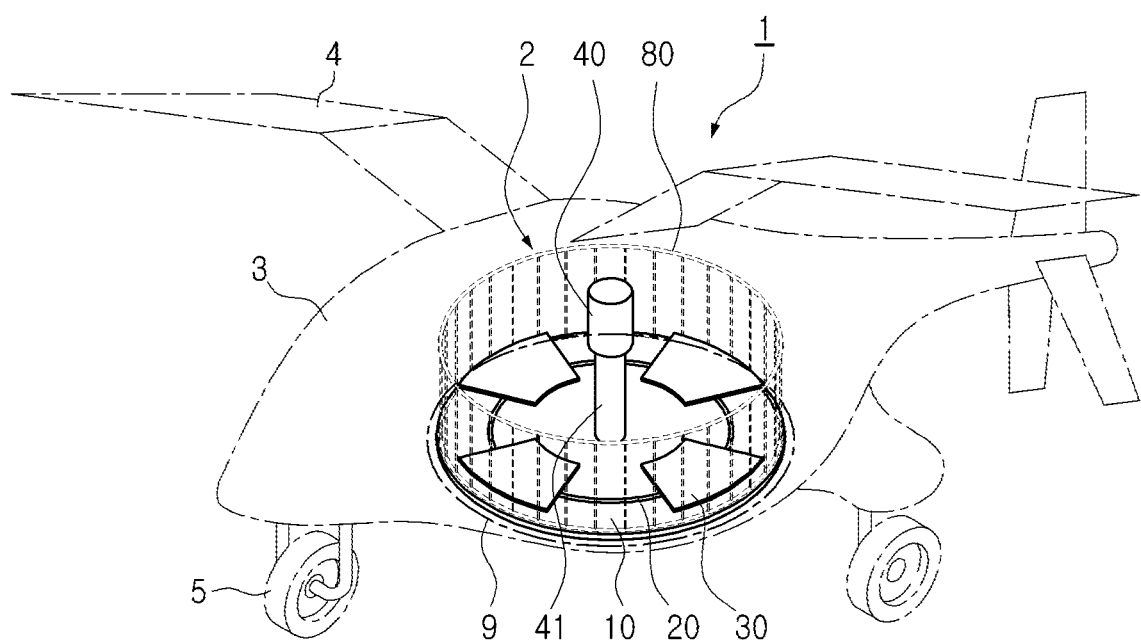
FIG. 1 is a diagram schematically illustrating an example of an air mobility to which an apparatus for loading and unloading cargo according to a first embodiment of the present disclosure is applied.

It is understood that the term "vehicle" or "vehicular" or other similar term as used herein is inclusive of motor vehicles in general and includes vehicles with internal combustion engines as well as electric vehicles and other alternative fuel vehicles (e.g., fuels derived from resources other than petroleum).

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation and can be implemented by hardware components or software components and combinations thereof.

Further, the control logic of embodiments of the present disclosure may be embodied as non-transitory computer readable media on a computer readable medium containing executable program instructions executed by a processor, controller, or the like. Examples of computer readable media include, but are not limited to, ROM, RAM, compact disc (CD)-ROMs, magnetic tapes, floppy disks, flash drives, smart cards, and optical data storage devices. The computer readable medium can also be distributed in network coupled computer systems so that the computer readable media is stored and executed in a distributed fashion, e.g., by a telematics server or a Controller Area Network (CAN).

Hereinafter, embodiments in the present disclosure will be described hereinafter with reference to the accompanying drawings. The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. In the drawings, the same reference numerals will be used throughout to designate the same or like elements, and the shapes and dimensions of elements may be exaggerated for clarity.

In the present specification, for convenience of description, embodiments of the present disclosure is described by taking a case in which it is applied to air mobility having a cargo hold as an example, but an exemplary embodiment of the present disclosure is not limited thereto. For example, it can be applied not only to air mobility, but also to water or underwater mobility, land mobility, and the like.

The terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

Figure 2:
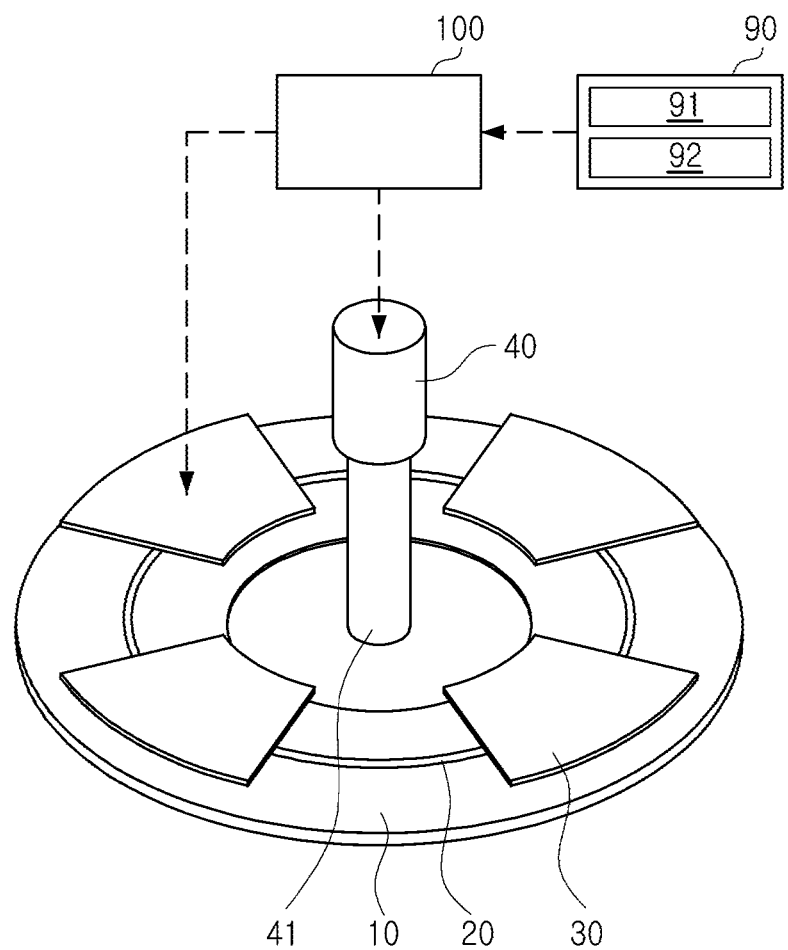
FIG. 2 is a perspective view illustrating an apparatus for loading and unloading cargo according to a first embodiment of the present disclosure.

FIG. 1 is a diagram schematically illustrating an example of air mobility to which an apparatus for loading and unloading cargo according to a first embodiment of the present disclosure is applied, and FIG. 2 is a perspective view illustrating the apparatus for loading and unloading cargo according to a first embodiment of the present disclosure.

The apparatus for loading and unloading cargo according to an exemplary embodiment of the present disclosure may be applied to air mobility 1 such as, for example, urban air mobility. Such air mobility may be utilized to move an individual or a plurality of passengers in or between a city center and a city center. Air mobility may also be utilized for delivery of cargo C (see FIG. 6), for example, a courier service, or the like.

In the air mobility 1, loading of the cargo 2 in the city center should be fast and convenient, and it should be possible to ensure safety.

To this end, the air mobility 1 may include a body 3 having a cargo hold 2 provided therein; wings 4 provided on the body; or a rotor (not shown) mounted on the body or the wings.

At least one person may ride in the body 3, but the body 3 is not limited thereto, and the body 3 may operate unmanned. The body may be provided with a cargo hold 2 for loading of the cargo C.

The wings 4 may be provided to extend to both sides of the body for flight of the body 3. When the air mobility 1 mainly uses a rotor, the wings may be omitted.

When a plurality of rotors are employed, each rotor may be driven by a motor (not shown), and a battery (not shown) may be mounted on the body 3 to supply power to the motor.

In addition, a plurality of wheels 5 capable of independently driving may be provided in a lower portion of the body to support the body 3 at a landing site or to move on the ground.

In order to transport the cargo C using the air mobility 1, the cargo is properly distributed and loaded in the cargo hold 2 of the body 3 in consideration of weight thereof, and appropriate means for unloading the cargo inside the cargo hold regardless of a loading order are required.

The apparatus for loading and unloading cargo according to a first embodiment of the present disclosure may include a base portion 10, a rail 20, a plurality of movable plates 30, and a raising-lowering portion 40.

The base portion 10 may constitute a bottom surface in the cargo hold 2 of the air mobility 1. To this end, an opening 9 may be formed in a lower portion of the cargo hold, and the base portion may have a shape conforming to a shape of the opening or have an area, at least greater than an area of the opening to close the opening.

An upper surface of the base portion 10 may be formed to be flat, and the base portion may have an approximately circular or elliptical shape. However, a shape of the base portion is not limited thereto and may have a polygonal shape or an arbitrary shape.

In addition, the base portion 10 is not limited to constituting the bottom surface of the cargo hold 2, a separate door structure may be provided on the bottom surface of the cargo hold, and the base portion may be exposed externally when a door is opened.

The rail 20 may be installed on the upper surface of the base portion 10. Such a rail may be formed in a ring shape having a circular or elliptical closed cross-section corresponding to the shape of the upper surface of the base portion. However, a shape of the rail is not limited thereto.

The plurality of movable plates 30 may be disposed on the rail 20 to move along the rail. For example, when the base portion 10 has a substantially circular shape, the movable plate may be formed in a sectoral shape with a width narrowing toward a center of the base portion.

An upper surface of each movable plate 30 may be formed to be flat for loading of cargo. In addition, a fastening portion may be formed on the upper surface of the movable plate for fixing the cargo C. For example, at least one T-slot 31 (see FIG. 3) having a cross-sectional shape formed in a T-shape is formed as the fastening portion, so that the cargo C loaded may be firmly fixed by an anchor or a hook coupled to the T-slot.

For the fixing of the cargo C, the cargo may be accommodated in a standardized box, and an anchor or a hook capable of being coupled to the T-slot 31 of the movable plate 30 may be provided on a bottom of a box. These T-slots and anchors or hooks that may be coupled to the T-slots constitute a fastening portion.

Alternatively, the asymmetrical and irregularly shaped cargo C may be fixedly tied to a pallet of a certain size, and an anchor or a hook capable of being coupled to the T-slot 31 of the movable plate 30 may be provided on a bottom of the pallet.

The disposition of the T-slot 31 and the anchor or hook constituting the fastening portion may be reversed. In other words, anchors or hooks may be provided on the movable plate 30, and T-slots may be formed in standardized boxes and pallets.

The box in which the cargo is accommodated or the pallet to which the cargo is fixedly tied may be fixed on the movable plate by the fastening portion. Accordingly, the movable plate 30 may move along the rail 20 with the cargo C placed on an upper surface thereof and spacing between cargo items and the position of the cargo in the cargo hold 2 may vary according to the movement of the movable plate.

As described above, since the movable plate 30 moves and a position of the cargo C may be changed, the apparatus for loading and unloading cargo may load and distribute the cargo appropriately in the cargo hold 2, and accordingly, the center of gravity of the air mobility 1 may be easily adjusted.

In addition, since the movable plate 30 on which the cargo C is placed may be moved to change the position of the cargo, the apparatus for loading and unloading cargo has an advantage in that cargo inside the cargo hold 2 may be unloaded regardless of a loading order.

Figure 3:
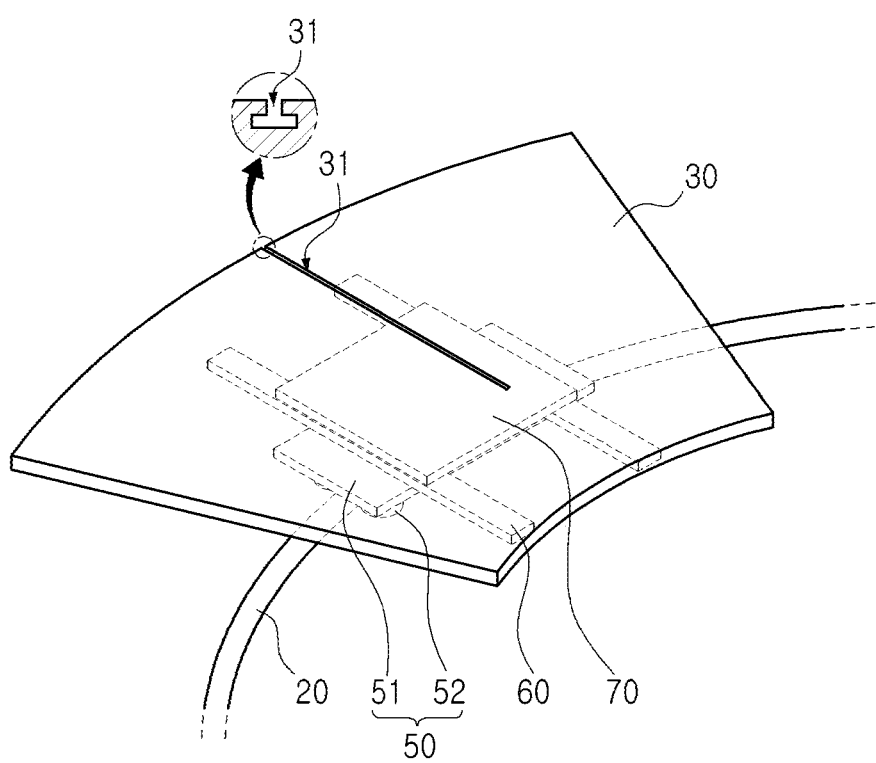
FIG. 3 is a view illustrating an apparatus for loading and unloading cargo according to the first embodiment of the present disclosure, with a movable plate omitted.
Figure 4:
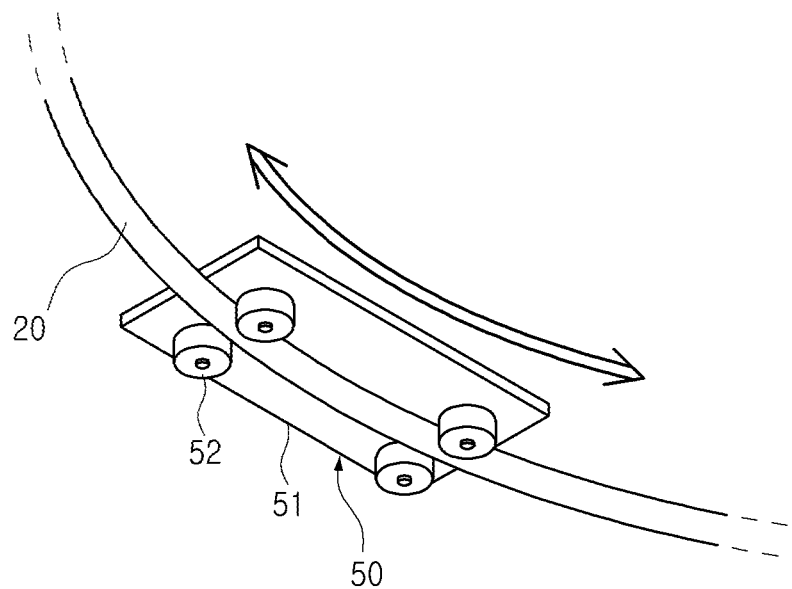
FIG. 4 is a view of the traveling cart shown in FIG. 3 as viewed from below.

FIG. 3 is a view illustrating an apparatus for loading and unloading cargo according to the first embodiment of the present disclosure, with a movable plate omitted, and FIG. 4 is a view from the bottom of the traveling cart illustrated in FIG. 3.

Substantially, in order to drive the movable plate between each movable plate 30 and the rail 20, a traveling cart 50 moving along the rail, at least one linear movement portion 60 installed on the traveling cart, and a seating portion 70 interposed between the linear movement portion and the movable plate may be further included.

The traveling cart 50 may include a cart body 51, a plurality of rollers 52 provided below the cart body and rolling along the rail 20, and a driving motor (not shown) providing a driving force necessary for driving the rollers.

The cart body 51 may movably support the linear movement portion 60, the seating portion 70, and the movable plate 30 on the rail 20. A plurality of rollers 52 may be provided in a lower portion of the cart body, and the plurality of rollers may roll while in contact with the rail.

Although the drawings show examples of rollers disposed on the rail 20 so that a rotation shaft of the roller 52 extends upwardly and downwardly, an orientation of the roller with respect to the rail is not limited thereto and may be changed according to a shape or design condition of the rail. For example, rollers may be disposed on the rail so that the rotation axis of the roller extends horizontally or obliquely.

The driving motor may be mounted on the cart body 51 to provide driving force to the at least one roller 52 and connected to a rotation shaft of the corresponding roller or may be embedded in the at least one roller. In order to supply power to the driving motor, a battery (not shown) may be mounted on the cart body or may be electrically connected to a battery of the body 3.

When power is applied to the driving motor, the corresponding roller 52 rotates and drives along the contacting rail 20, and a position of the cart body 51 may be changed within a trajectory of the rail by rolling the rollers.

The linear movement portion 60 is a member for moving the movable plate 30 in a straight line. As the linear movement portion, a linear motor, a linear motion slide, a linear motion guide, a linear chain actuator, and the like, may be employed. A detailed description of their configuration will be omitted.

At least one linear movement portion 60 may be disposed to extend in a direction intersecting the rail 20 on the cart body 51 of the traveling cart 50. Accordingly, a moving block of the linear movement portion may move radially on the base portion 10.

In order to supply power to the driving unit of the linear movement portion 60, the driving unit may be electrically connected to a battery in the cart body 51 of the traveling cart 50 or a battery in the body 3.

The seating portion 70 may be fixedly installed on the moving block of the linear movement portion 60 to movably support the movable plate 30 according to an operation of the linear movement portion. For example, when a plurality of linear movement portions are employed, the seating portion may be fixed to the moving blocks so as to span the moving blocks of these linear movement portions.

The movable plate 30 is seated on an upper surface of the seating portion 70 and may be coupled, for example, by bolting. However, a coupling method between the movable plate and the seating portion is not limited thereto.

Figure 5:
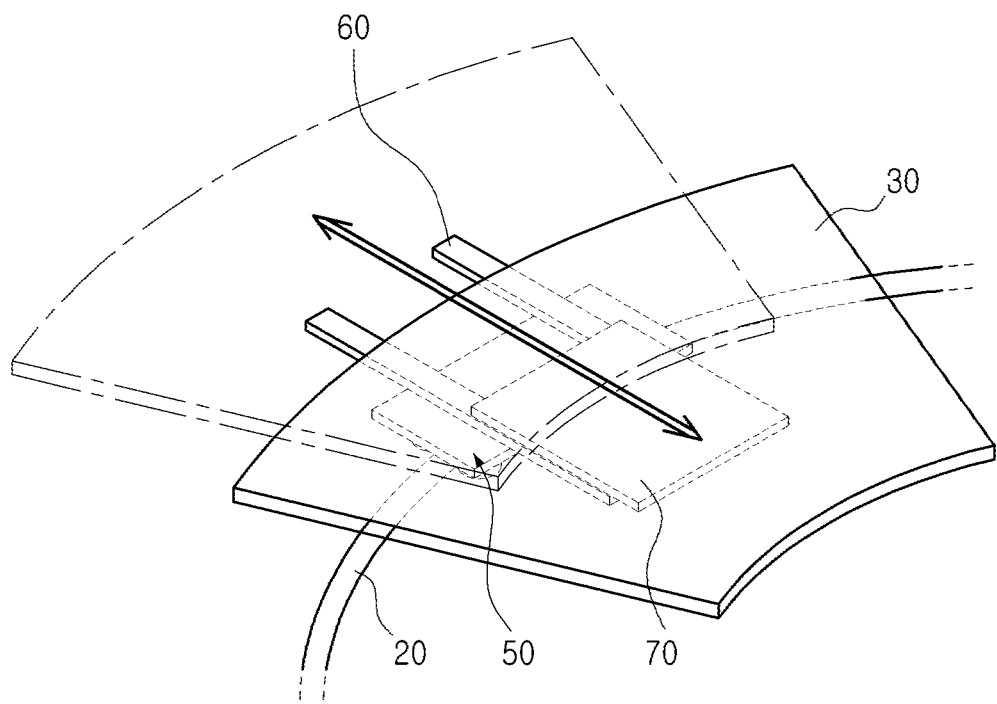
FIG. 5 is an operation state diagram illustrating an example in which a movable plate moves radially.

FIG. 5 is an operation state diagram illustrating an example in which a movable plate moves radially.

When power is applied to the driving unit of the linear movement portion 60, the corresponding moving block moves radially on the base portion 10, and accordingly, the movable plate 30 placed on the seating portion 70 also moves radially on the base portion, so that it is possible to gather close to each other toward a center of the base portion or to be separated from each other.

Referring back to FIGS. 1 and 2, as the raising-lowering portion 40, for example, a hydraulic cylinder having an operating rod 41 expanding and contracting may be adopted, but an exemplary embodiment thereof is not limited thereto, and an electric actuator equipped with an operating rod may also be used.

When the raising-lowering portion 40 is a hydraulic cylinder, a fluid pressure line for driving may be installed in the body 3 and connected to the fluid pressure cylinder, and the fluid may be provided from a pump or a compressor.

The raising-lowering portion 40 may be fixedly installed in the cargo hold 2, and an end portion of the operating rod 41 may be fixedly connected to the base portion 10. To this end, for example, the raising-lowering portion may be fixed to a ceiling of the cargo hold and the operating rod may be disposed in a state extending downwardly.

An end portion of the operating rod 41 is preferably fixed in line with a center of the base portion 10. In addition, a position of the raising-lowering portion 40, the base portion 10, and an opening 9 of the cargo hold 2 may be set so that a connection point of the end portion of the operating rod and the base portion is located adjacent to center of gravity of the air mobility 1 itself.

By such an operation of the raising-lowering portion 40, in a space between the body 3 of the air mobility 1 and the ground, the base portion 10, the rail 20, the plurality of movable plates 30, and the like may be raised or lowered together and simultaneously.

Accordingly, when the raising-lowering portion 40 is lowered, the movable plate 30 may be accessed from the outside of the air mobility 1, and when the raising-lowering portion is raised after cargo C is placed, the cargo may be easily loaded into the cargo hold 2. In addition, the cargo placed on the movable plate may be easily unloaded out of the cargo hold by the lowering of the raising-lowering portion.

As illustrated in FIG. 1, the apparatus for loading and unloading cargo according to a first embodiment of the present disclosure may further include a barrier 80 installed along an edge of the opening 9 in the cargo hold 2.

The barrier may be approximately formed in a form of a fence, but is not limited thereto, and may be formed, for example, in a form of a partition. Such a barrier may prevent the cargo C placed on the movable plate 30 from being separated from the apparatus for loading and unloading cargo according to embodiments of the present disclosure and the cargo hold.

In addition, as illustrated in FIG. 2, the apparatus for loading and unloading cargo according to a first embodiment of the present disclosure may further include a sensor unit 90 and a control unit 100.

The sensor unit 90 may include a load sensing unit 91 sensing a weight of the cargo C placed on each movable plate 30, and a position sensing unit 92 sensing a position of a plurality of movable plates 30 or a traveling cart 50 moving on the rail 20. For example, a load cell may be used as the load sensing unit. For example, at least one position sensor, an image sensor, and the like, may be used as the position sensing unit.

The load sensing unit 91 may be disposed on at least one of the movable plates 30, the seating portion 70, and the cart body 51 of the traveling cart 50. When a plurality of position sensors are employed as the position sensing unit 92, these position sensors may be disposed on the rail 20, an upper surface of the base 10 around the rail, a barrier 80 or a ceiling of the cargo hold 2, or the like. When the image sensor is employed as the position sensing unit, the image sensor may be disposed on an inner wall or a ceiling of the cargo hold.

The control unit 100 may control a spacing and positions of the movable plates on the rail 20 according to a sensing signal related to a load of the cargo C received from the sensor unit 90 and a sensing signal related to the position of the corresponding movable plate 30. To this end, the control unit may be electrically connected to a driving motor of the traveling cart 50, a driving unit of the linear movement portion 60, a driving source of the raising-lowering portion 40, and the like through wired or wireless communication.

The control unit 100 may receive a sensing signal related to the load of the cargo C and a sensing signal related to the position of the corresponding movable plate 30 from the sensor unit 90 in real time, and may immediately transmit a command signal to the driving motor of the traveling cart 50, the driving unit of the linear movement portion 60, and the driving source of the raising-lowering portion 40 according to the received information and the set control logic to automatically adjust the spacing between the cargoes and the position of each cargo.

The control unit 100 may be implemented with various processing devices, such as a microprocessor, in which a semiconductor chip capable of performing various operations or commands, or the like, is embedded, and may control an overall operation of the apparatus for loading and unloading cargo of embodiments of the present disclosure.

For example, the control unit 100 may be incorporated into a control system of the air mobility 1 or used in combination thereof.

Accordingly, the control unit 100 may change a position of the cargo C by moving the movable plate 30 according to the movement of the center of gravity due to the change in the posture of the air mobility 1 during the operation thereof.

Conversely, by moving the movable plate to change the position of the cargo for efficient and safe flight, posture imbalance or thrust imbalance of air mobility may be resolved.

Since various techniques for calculating or estimating the center of gravity have been proposed and known, a detailed description thereof will be omitted herein.

Figure 6A:
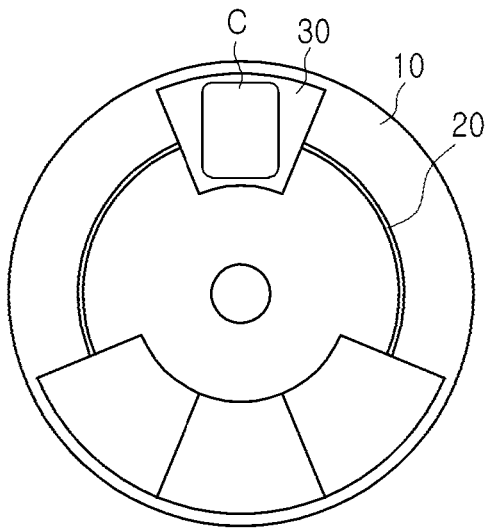
FIGS. 6a to 6c are operation state diagrams illustrating examples in which a movable plate moves in a circumferential direction.
Figure 6B:
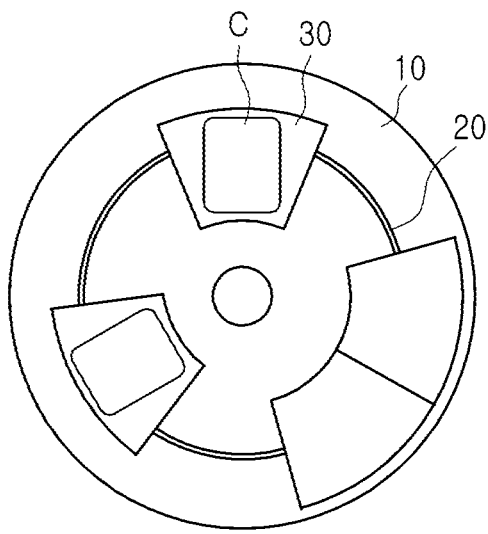
Figure 6C:
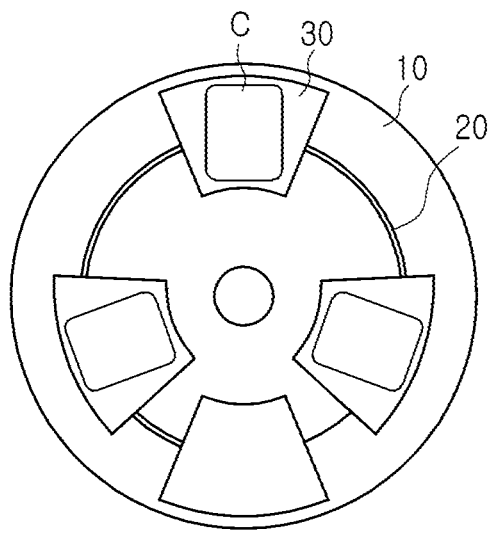

FIGS. 6*a* to 6*c* are operation state diagrams illustrating examples in which a movable plate moves in a circumferential direction.

As shown in FIG. 6*a*, for example, when only one cargo C is transported by completing a delivery of other cargoes, in order to adjust center of gravity of the air mobility 1, the control unit 100 may move and arrange a movable plate without cargo in a circumferential direction to an opposite direction thereof on the rail 20 in response to a movable plate 30 on which cargo is placed.

As described above, the movable plate 30 without cargo may serve as a weight used to adjust the center of gravity of the air mobility 1.

In addition, a radial position of the movable plate 30 on which the cargo C is placed may be adjusted to be adjacent to a center of the base portion 10, while a radial position of the movable plate without cargo may be adjusted to be relatively far away from the center of the base portion.

As shown in FIGS. 6*b* and 6*c*, when a plurality of cargoes C are transported, in order to adjust the center of gravity of the air mobility 1, the control unit 100 may move the movable plates 30 having cargo placed thereon and a movable plate without cargo in a circumferential direction on the rail 20 and may appropriately arrange the movable plates according to the weight thereof.

In addition, a radial position of the movable plate 30 on which a relatively heavy cargo C is placed may be adjusted to be adjacent to the center of the base portion 10, while a radial position of the movable plate on which a relatively light cargo is placed or the movable plate without cargo is relatively far away from a center of the base portion.

As described above, when the cargo C is transported, in order to adjust the center of gravity of the air mobility 1, the control unit 100 of the apparatus for loading and unloading cargo according to a first embodiment of the present disclosure may move the movable plate 30 in a circumferential direction and/or radially.

FIGS. 7*a* to 7*e* are views for illustrating an operation of the apparatus for loading and unloading cargo according to the first embodiment of the present disclosure.

Figure 7A:
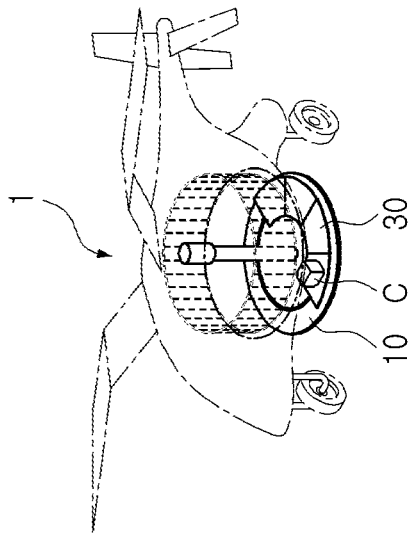
FIGS. 7a to 7e are views for illustrating an operation of the apparatus for loading and unloading cargo according to the first embodiment of the present disclosure.

In FIG. 7*a*, an air mobility 1 has landed on a landing site, and an opening 9 formed in a cargo hold 2 of the air mobility may be closed by a base portion 10.

Figure 7B:
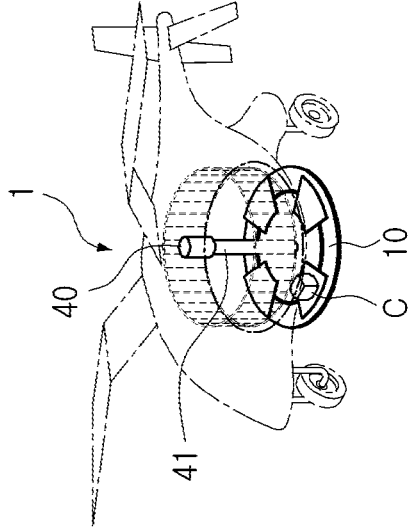

In FIG. 7*b*, a raising-lowering portion 40 operates so that the base portion 10, the rail 20 installed thereon, the plurality of movable plates 30, and the like, may descend from the air mobility 1 toward the ground. Accordingly, the base portion has a position in which the cargo C may be easily loaded or unloaded into and out of the cargo hold 2.

Figure 7C:
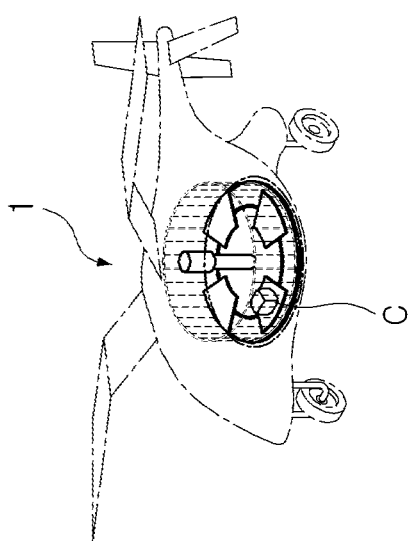

In FIG. 7*c*, the movable plate 30 may move in a circumferential direction along the rail 20 to a position for more convenient loading or unloading of the cargo C.

Figure 7D:
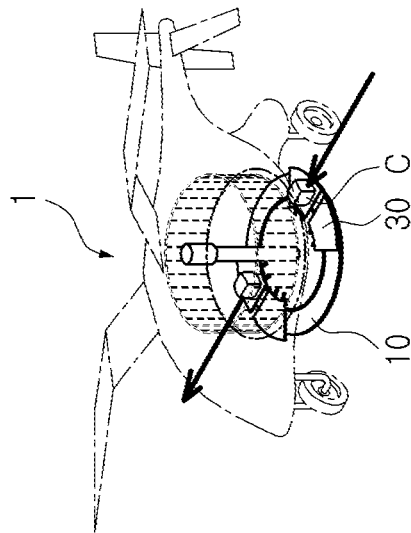

In addition, in FIG. 7*d*, at least one movable plate 30 may be moved radially outwardly by a linear movement portion 60 to a position for more convenient loading or unloading of the cargo C.

Figure 7E:
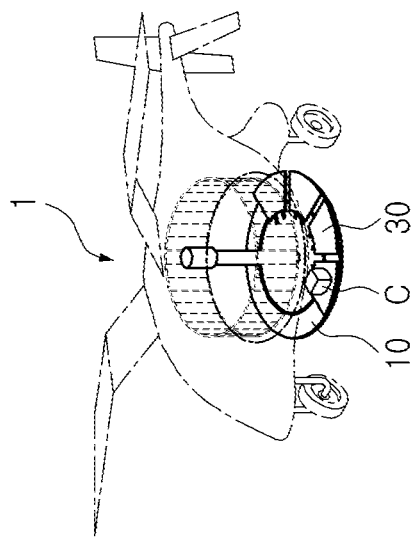

Meanwhile, in FIG. 7*e*, an example in which loading is performed on one side and unloading is performed on the other side of left and right sides of the air mobility 1 is illustrated.

As described above, according to the apparatus for loading and unloading cargo to the first embodiment of the present disclosure, several cargoes may be loaded or unloaded at the same time, thereby minimizing time and a process required for loading and unloading.

Figure 8:
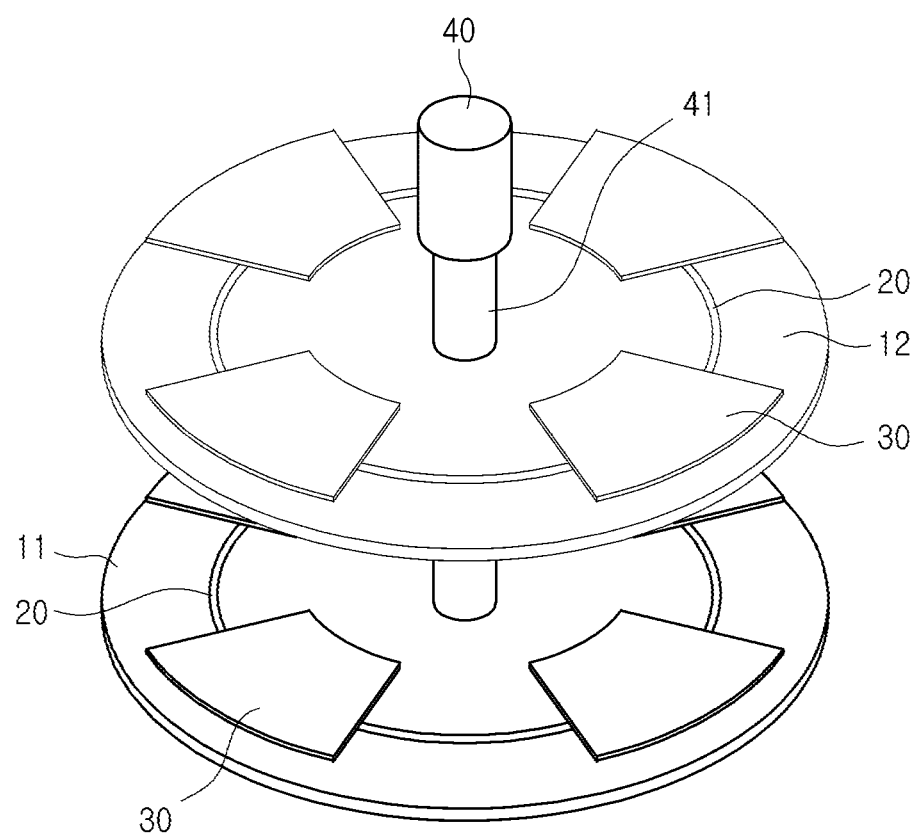
FIG. 8 is a perspective view illustrating an apparatus for loading and unloading cargo according to a second embodiment of the present disclosure.

FIG. 8 is a perspective view illustrating an apparatus for loading and unloading cargo according to a second embodiment of the present disclosure.

Referring to FIG. 8, the apparatus for loading and unloading cargo according to the second embodiment of the present disclosure may include a plurality of base portions 11 and 12, a rail 20, a plurality of movable plates 30, and a raising-lowering portion 40.

The second embodiment of the present disclosure shown in FIG. 8 is different only in that the plurality of base portions 11 and 12 are disposed, and the remaining components are the same as those of the first embodiment shown in FIGS. 1 to 7. Accordingly, in describing the apparatus for loading and unloading cargo according to the second embodiment of the present disclosure, the same reference numerals are given to the same components as those of the apparatus for loading and unloading cargo according to the first embodiment described above, and detailed descriptions of their configurations and functions will be omitted.

The plurality of base portions may include a first base portion 11 and a second base portion 12, and the first and second base portions may be fixedly disposed in an operating rod 41 in one raising-lowering portion 40 to be vertically spaced apart from each other.

For example, the first base portion 11 may be disposed therebelow to constitute a bottom surface in a cargo hold 2 of the air mobility 1. The first base portion may have a shape conforming to an opening 9 formed in the cargo hold of the air mobility or may have an area at least greater than an area of an opening to close the opening.

The second base portion 12 may be disposed above the first base portion 11 to be accommodated in the cargo hold 2 of the air mobility 1.

Upper surfaces of the first and second base portions 11 and 12 may be formed to be flat, and the base portions may have an approximately circular or elliptical shape.

A rail 20 may be installed on each of the upper surfaces of the first and second base portions 11 and 12. Such a rail may be formed in a ring shape having a circular or elliptical closed cross-section corresponding to the shape of the upper surface of each of the base portions.

The plurality of movable plates 30 are disposed on a rail 20 to move along the rail. For example, when the first and second base portions 11 and 12 have a substantially circular shape, the movable plate may be formed in a substantially sectoral shape.

An upper surface of each movable plate 30 is preferably formed to be flat, and the cargo C may be firmly fixed to the upper surface of the movable plate.

Accordingly, the movable plate 30 may move along the rail 20 with the cargo C placed on the upper surface thereof, and a spacing between cargoes and a position of the cargo in the cargo hold 2 may be changed according to the movement of the movable plate.

As described above, since the movable plate 30 is moved so that the position of the cargo C may be change in a circumferential direction and/or radially on each of the base portions 11 and 12, in the apparatus for loading and unloading cargo of embodiments of the present disclosure, the cargo may be properly distributed and loaded in the cargo hold 2, and accordingly, alignment of the center of gravity of the air mobility 1 may be easily achieved.

In addition, since the movable plate 30 on which the cargo C is placed may be moved to change the position of the cargo, the apparatus for loading and unloading cargo of embodiments of the present disclosure has an advantage of unloading the cargo inside the cargo hold 2, regardless of the loading order.

As a raising-lowering portion 40, for example, a hydraulic cylinder having an operating rod 41 expanding and contracting may be adopted, but an exemplary embodiment thereof is not limited thereto.

The raising-lowering portion 40 may be fixedly installed on the cargo hold 2, for example, an end portion of the operating rod 41 may be fixedly connected to the first base portion 11, and an intermediate portion of the operating rod 41 may be fixedly connected to the second base portion 12. To this end, for example, the raising-lowering portion 40 may be fixed to a ceiling of the cargo hold and the operating rod may be disposed in a state extending downwardly.

The operating rod 41 is preferably fixed to a center of each of the base portions 11 and 12. In addition, a position of the base portion, the raising-lowering portion 40, and an opening 9 of the cargo hold 2 may be set so that a connection point of the operating rod and each base portion is located adjacent to the center of gravity of the air mobility 1.

By an operation of the raising-lowering portion 40, the plurality of base portions 11 and 12, and the rail 20 and the plurality of movable plates 30 mounted on each of the base portions may be raised or lowered together and at the same time.

Accordingly, when the raising-lowering portion 40 descends, the cargo C may be placed on the movable plate 30 of any one of the plurality of base portions 11 and 12, and then when the raising-lowering portion rises, the cargo may be easily loaded into the cargo load 2. In addition, the cargo placed on the movable plate may be easily unloaded out of the cargo hold by the lowering of the raising-lowering portion.

As described above, the apparatus for loading and unloading cargo according to the second embodiment of the present disclosure has an advantage of loading cargo by varying a type, a weight, and a volume of the cargo for each first and second base portion, so that, for example, air mobility used in a courier service, or the like, may be efficiently operated, in addition to an advantage of loading and transporting more cargo than the first embodiment.

As set forth above, according to the apparatus for loading and unloading cargo according to an exemplary embodiment of the present disclosure, by automatically distributing the cargo in consideration of a weight thereof, alignment of center of gravity for an operation may be easily performed, and accordingly, efficiency and safety of a flight may be improved.

According to the apparatus for loading and unloading cargo according to an exemplary embodiment of the present disclosure, it is possible to unload as desired regardless of a loading order of the cargo, and furthermore, it is possible to load or unload several cargoes at the same time, so that a time and process required for loading and unloading may be minimized.

While the example embodiments have been illustrated and described above, it will be apparent to those skilled in the art that modifications and variations could be made without departing from the scope of the present disclosure as defined by the appended claims.

What is claimed is:

1. An apparatus for loading and unloading cargo, the apparatus comprising:
    a base portion;
    a rail installed on the base portion;
    a plurality of movable plates disposed on the rail, supporting the cargo, and moving along the rail; and
    a raising-lowering portion connected between the base portion and a body comprising a cargo hold so that the base portion can be raised and lowered.

2. The apparatus of claim 1, wherein the raising-lowering portion comprises an operating rod expanding and contracting, and
    wherein the raising-lowering portion is installed in the cargo hold of the body, and
    wherein an end portion of the operating rod is fixedly connected to the base portion.

3. The apparatus of claim 2, wherein the base portion comprises a first base portion and a second base portion,
    wherein the first base portion and the second base portion are fixedly disposed on the operating rod to be vertically spaced apart from each other, and
    wherein a rail and the movable plates are installed in the first base portion and the second base portion, respectively.

4. The apparatus of claim 1, wherein, by an operation of the raising-lowering portion, the base portion is raised or lowered in a space between the body and the ground.

5. The apparatus of claim 1, wherein the body comprises an opening formed in a lower portion of the cargo hold, and
    wherein the base portion has a shape conforming to a shape of the opening or has an area at least greater than an area of the opening to close the opening.

6. The apparatus of claim 5, further comprising a barrier installed along an edge of the opening in the cargo hold.

7. The apparatus of claim 1, wherein the rail is formed in a ring shape having a closed cross-section.

8. The apparatus of claim 7, wherein the base portion and the rail have a circular or elliptical shape, and
    wherein the movable plates are formed in a sectoral shape.

9. The apparatus of claim 1, wherein a fastening portion for fixing cargo is formed on an upper surface of the movable plates, and
    wherein a standardized box in which the cargo is accommodated or a pallet in which the cargo is fixedly tied is fixed on the movable plates by the fastening portion.

10. The apparatus of claim 1, further comprising:
    a traveling cart moving along the rail;
    at least one linear movement portion installed on the traveling cart; and
    a seating portion interposed between the linear movement portion and the movable plates.

11. The apparatus of claim 10, wherein the traveling cart comprises:
    a cart body;
    a plurality of rollers provided in the cart body and rolling along the rail; and
    a driving motor providing driving force to the roller.

12. The apparatus of claim 11, wherein the linear movement portion extends in a direction intersecting the rail on the cart body, and a moving block of the linear movement portion is disposed to be movable radially on the base portion.

13. The apparatus of claim 12, wherein the seating portion is fixedly installed on the moving block to support the movable plates to be movable in a straight line according to an operation of the linear movement portion.

14. The apparatus of claim 10, further comprising a sensor unit, wherein the sensor unit comprises:

a load sensing unit for sensing a weight of cargo placed on the movable plates, and a position sensing unit for sensing a position of the movable plates or the traveling cart moving on the rail.

15. The apparatus of claim 14, further comprising a control unit for controlling a spacing and positions of the plurality of movable plates on the rail according to a sensing signal received from the sensor unit, wherein the control unit is electrically connected to a driving motor of the traveling cart, a driving unit of the linear movement portion, and a driving source of the raising-lowering portion.

16. The apparatus of claim 1, wherein a movable plate without cargo among the plurality of movable plates act as a weight used to adjust center of gravity.

17. An apparatus for loading and unloading cargo, comprising:

a base portion;

a rail installed on the base portion;

a plurality of movable plates disposed on the rail, supporting the cargo, and moving along the rail;

a raising-lowering portion connected between the base portion and a body comprising a cargo hold so that the base portion can be raised and lowered;

a sensor unit including a load sensing unit for sensing a weight of the cargo placed on the movable plates; and a control unit for moving at least one of the plurality of movable plates in a circumferential direction or radially on the rail according to a sensing signal received from the sensor unit.

18. The apparatus of claim 17, wherein the sensor unit further comprises a position sensing unit for sensing a position of the movable plates moving on the rail, and wherein the control unit is configured to control a spacing and positions of the plurality of movable plates on the rail according to a sensing signal received from the sensor unit.

\* \* \* \* \*